United States Patent [19]

Ohshima

[11] Patent Number: 5,201,052
[45] Date of Patent: Apr. 6, 1993

[54] SYSTEM FOR TRANSFERRING FIRST AND SECOND RING INFORMATION FROM PROGRAM STATUS WORD REGISTER AND STORE BUFFER

[75] Inventor: Toshiharu Ohshima, Kawasaki, Japan

[73] Assignee: Fujitsu Limited, Kawasaki, Japan

[21] Appl. No.: 899,946

[22] Filed: Jun. 17, 1992

Related U.S. Application Data

[63] Continuation of Ser. No. 477,549, Feb. 9, 1990, abandoned.

[30] Foreign Application Priority Data

Feb. 10, 1989 [JP] Japan ................................. 1-31914

[51] Int. Cl.$^5$ ............................................. G06F 12/14
[52] U.S. Cl. ............................. 395/725; 364/DIG. 1; 364/286.4; 364/285; 364/246.6; 364/247; 364/241.2; 395/425; 395/375
[58] Field of Search ................. 395/725, 425, 575, 375

[56] References Cited

U.S. PATENT DOCUMENTS

| | | | |
|---|---|---|---|
| 3,858,182 | 12/1974 | Delagi et al. | 340/172.5 |
| 4,247,894 | 1/1981 | Beismann et al. | 364/200 |
| 4,338,661 | 7/1982 | Tredennick et al. | 364/200 |
| 4,352,157 | 9/1982 | Namimoto et al. | 364/200 |
| 4,366,537 | 12/1982 | Heller et al. | 364/200 |
| 4,410,939 | 10/1983 | Kawakami | 364/200 |
| 4,517,643 | 5/1985 | Bannai | 364/200 |
| 4,581,702 | 4/1986 | Saroka et al. | 395/425 |
| 4,654,779 | 3/1987 | Kato et al. | 364/200 |
| 4,782,443 | 11/1988 | Matsumoto | 364/200 |
| 4,835,685 | 5/1989 | Kun | 364/200 |
| 4,858,111 | 8/1989 | Steps | 364/200 |
| 4,881,228 | 11/1989 | Shouda | 371/19 |
| 4,930,068 | 5/1990 | Katayose et al. | 364/200 |
| 4,961,135 | 10/1990 | Uchihori | 364/200 |
| 4,979,098 | 12/1990 | Baum et al. | 364/200 |
| 5,023,773 | 6/1991 | Baum et al. | 364/200 |

FOREIGN PATENT DOCUMENTS 0149392 7/1985 European Pat. Off. .

OTHER PUBLICATIONS

Kindervater, J. et al., "Performance of P9X00 Processor," *Phillips Telecommunication & Data Systems Review*, vol. 46, No. 2, Jun. 1988, pp. 13–34.

Primary Examiner—Thomas C. Lee
Assistant Examiner—Mehmet Geckil
Attorney, Agent, or Firm—Staas & Halsey

[57] ABSTRACT

A microprocessor provides a CPU to execute a program and a register to store a program status word indicative of a status of the program being executed by the CPU. The program status word includes ring information on the program being executed. A store buffer is provided with write data to be written into an external memory and a corresponding address when the CPU executes a write instruction. The store buffer has a specific area in which ring information on the write instruction is stored. A control part reads out the write data and address from the store buffer and writes the same into the external memory independent of execution of the program by the CPU.

16 Claims, 5 Drawing Sheets

SYSTEM FOR TRANSFERRING FIRST AND SECOND RING INFORMATION FROM PROGRAM STATUS WORD REGISTER AND STORE BUFFER this is a continuation of co-pending application Ser. No. 07/477,549 filed on Feb. 9, 1990, now abandoned.

BACKGROUND OF THE INVENTION

1. Field of the Invention

The present invention generally relates to a microprocessor having a store buffer, and more particularly to a microprocessor in which data is written into an external memory through a store buffer independently of another instruction process.

2. Description of the Related Art

Recently, there has been considerable activity in the development of a microprocessor having a built-in cache and/or a store buffer, which is provided for reducing the time it takes to access an external memory. Generally, such a microprocessor uses ring information for protecting the contents of the external memory from being damaged. Ring information is provided for each area of the external memory. For example, ring information defines four different levels of '0', '1', '2' and '3', in which ring level '0' is the highest. Ring information is used for discriminating a privileged level of an operating system against a non-privileged level thereof or preventing the contents of the external memory from being mistakenly accessed by a task in a multi-task processing. Ring information on a program which is being processed is represented in a program status word (PSW). For example, when an area of the external memory is accessed by a program (instruction), ring information on that area is compared with the current ring information described in the program status word. For example, when the area to be accessed has ring level '2' and the current ring information represents ring level '2', the access to the area is inhibited.

A microprocessor having a cache memory is known. Such a microprocessor has a mode in which data is written into a cache memory and an external memory at the same time. Generally, it takes a long time to write data into the external memory. It is noted that an instruction cycle in the microprocessor must be stopped until an instruction to write data into the external memory is completed. This deteriorates performance of the microprocessor.

From this viewpoint, a microprocessor having a store buffer in addition to the cache memory has been proposed. In such a microprocessor, when data is written into the external memory, the data and a corresponding address of the external memory are written into the store buffer by an instruction to write data into the external memory issued by a central processing unit (CPU). The execution of this instruction is completed when the address and data are written into the store buffer. Thus, the microprocessor can execute another instruction. On the other hand, when a bus provided between the microprocessor and the external memory becomes available, data is read out from the store buffer and then written into the external memory independently of the execution of another instruction by the CPU.

When an error occurs while the data is being read out from the store buffer and written into the external memory, an exception processing request for processing such an error takes place in asynchronism with a subsequent instruction which is generated after the instruction to write data into the external memory is completed. There is a possibility that a different exception processing request occurs when a subsequent instruction is being executed while the exception processing request for processing the above-mentioned error is being processed. From this point of view, it is necessary to consider priority between these different exception processing requests.

In the case where the microprocessor is designed so that the data write process using the store buffer is independent of another instruction, it is impossible to try to execute the instruction to write data into the external memory again from the beginning thereof when an error occurs while the data is being written into the external memory. This is because the instruction to write data into the external memory is completed when the data and associated address are written into the store buffer. For this reason, when an error is detected while data is being read out from the store buffer and transferred to the external memory, some information is saved in a predetermined area together with the program status word and an instruction address to which the process returns. For example, the above-mentioned information to be saved includes an instruction address of the instruction to write data into the external memory, an operand address, operand data and control information on operand access. After the operating system removes the cause of error, data is read out from the store buffer and written into the external memory in accordance with the information to be saved. The control information on operand access includes an operand size and information whether or not it is necessary to translate a logical (virtual) address into a physical address.

Conventionally, ring information described in the program status word which is saved in the predetermined area, is used when trying to write data into the external memory again after an error occurs. The saved program status word relates to an address to which the process returns. Thus, the saved program status word has ring information indicating a ring level obtained when an instruction which is being processed in the store buffer at the time of detecting an error is completed. This ring level must be maintained until writing data into the external memory is retried. If the ring level is changed, some problems occur when writing data into the external memory is tried again. For example, a data write inhibit area of the external memory may be accessed in error so that the contents of the area are damaged.

For this reason, it is required to provide priority between the exception processes with a limitation. For example, an exception processing request other than an exception process request for processing an error occurring in the store buffer is accepted ahead of the latter exception process. However, when the former exception processing request is handled by the operating system, which generally has the highest ring level, the ring information described in the program status word is changed by information relating to the operating system. Thus the program status word to be saved by the exception process request for processing errors in the store buffer which occurs after the operating system runs, has information relating to the operating system. That is, in the program status word to be saved, no information is left which is obtained when reading out data from the store buffer and writing the same into the external memory.

Alternatively, it is conceivable to accept the exception processing request for processing an error occurring in the store buffer ahead of other exception processing requests. In this case, when an instruction to change ring information in the program status word is generated, the CPU cannot execute this instruction until the store buffer becomes available. For this reason, the microprocessor operates at a decreased processing speed. In addition, when the above-mentioned instruction has a priority level higher than the exception processing request for processing an error occurring in the store buffer, this instruction is not allowed to be processed ahead of the exception processing process. Further, there is a problem. It is now assumed that an instruction has a basic length of two bytes and must have an instruction address having an even number without exception. If a branch instruction indicates an odd number branch address, an associated exception process request occurs. In this exception process, an address of the branch instruction and the inappropriate branch address must be saved. When the exception processing request for processing an error occurring in the store buffer is accepted ahead of the exception processing request for processing the odd number branch address, information relating to the latter exception processing request is handled as information about the former exception processing request. As described above, a limitation provided to priority between the different exception processing requests causes various problems.

SUMMARY OF THE INVENTION

It is a general object of the present invention to provide an improved microprocessor having a store buffer in which the aforementioned disadvantages are overcome.

A more specific object of the present invention is to provide a microprocessor capable of handling exception (interruption) process requests in accordance with priority therebetween without any limitation.

The above-mentioned objects of the present invention are achieved by a microprocessor connectable to an external memory having a plurality of areas assigned individual ring information for controlling access to said areas, said microprocessor comprising executing means for executing a program; and a register storing a program status word indicative of a status of said program being executed by said executing means. The program status word includes ring information on said program being executed. A store buffer is operatively coupled to said executing means and is provided with write data to be written into said external memory and a corresponding address when said executing means executes a write instruction, said store buffer having a specific area in which ring information on said write instruction is stored. The microprocessor further comprises control means, operatively coupled to said store buffer and said external memory, for reading out said write data and address from said store buffer and writing the same into said external memory independently of executing said program by said executing means.

Further objects, features and advantages of the present invention will become apparent from the following detailed description when read in conjunction with the accompanying drawings.

DESCRIPTION OF THE PREFERRED EMBODIMENT

Figure 1:
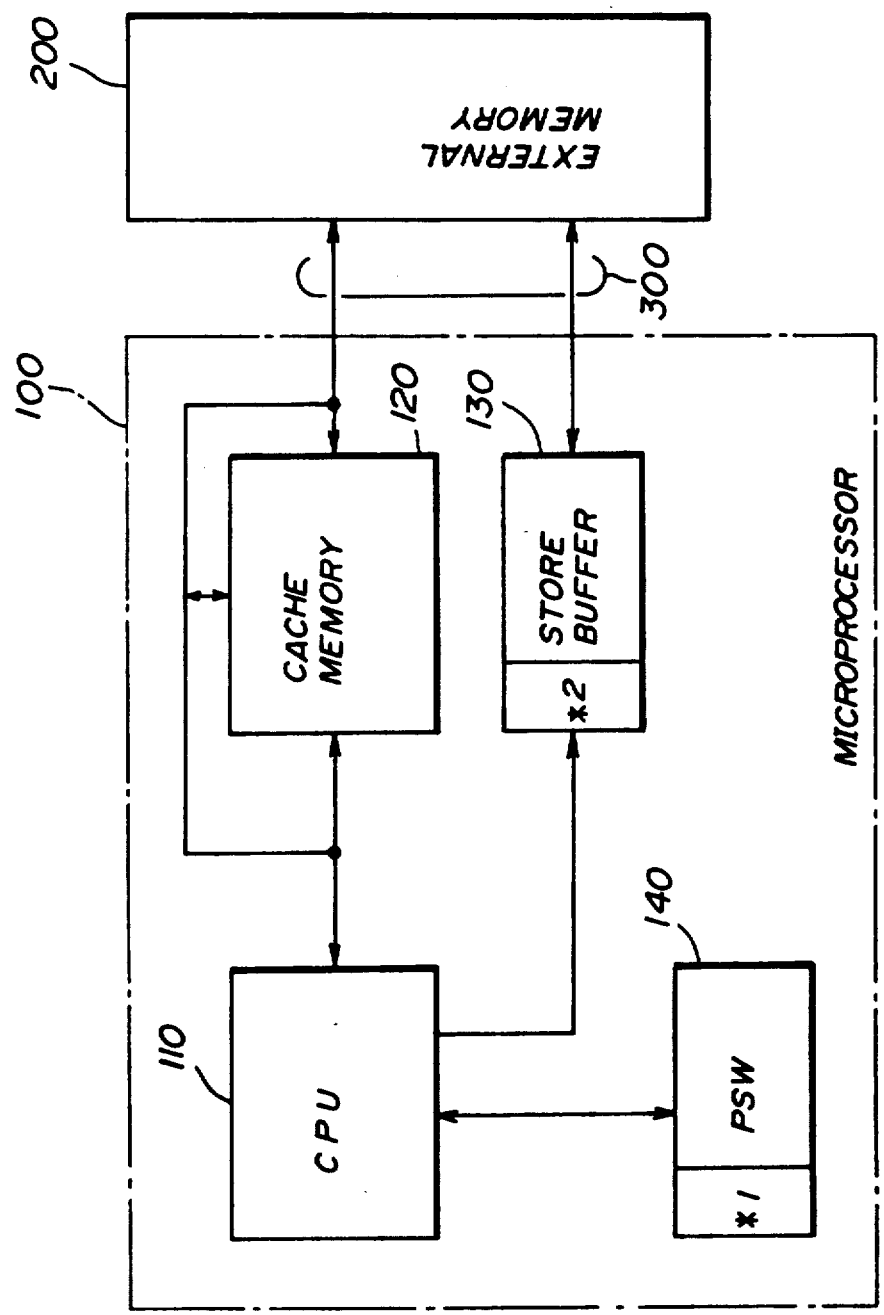
FIG. 1 is a block diagram illustrating an outline of a microprocessor according to a preferred embodiment of the present invention.

FIG. 1 illustrates an outline of a microprocessor according to a preferred embodiment of the present invention. A microprocessor 100 is coupled to an external memory 200 through an external bus 300. The microprocessor 100 includes a central processing unit (CPU) 110, a cache memory 120, a store buffer 130 and a register 140 in a single semiconductor substrate. Data is written into the cache memory 120 and the external memory 200 at the same time. Data and associated information are written into the store buffer 130. The program status word (PSW) is registered in the register 140. As described previously, the program status word (PSW) includes the current ring information indicated by a reference *1 which indicates one of the predetermined ring levels. According to the present invention, ring information (indicated by a reference *2) on the write instruction to write data from the store buffer 130 into the external memory 200 is stored in the store buffer 130 independently of the register 140. When an error occurs while data is being read out from the store buffer 130 and written into the external memory 200, the ring information in the store buffer 130 is saved in the external memory 200. When the cause of the error is eliminated, the ring information saved in the external memory 200 is written into the store buffer 130. Thus, the CPU 110 is free to change the ring information *1 represented in the program status word (PSW) stored in the register 140 without any limitation in order to process a subsequent processing request, or an interruption or exception processing request resulting from a subsequent process. As a result, it is possible for the CPU 110 to execute a subsequent instruction without waiting for the completion of writing data read out the store buffer 130 into the external memory 200. Thus, the microprocessor 100 operates at increased speeds.

Figure 2:
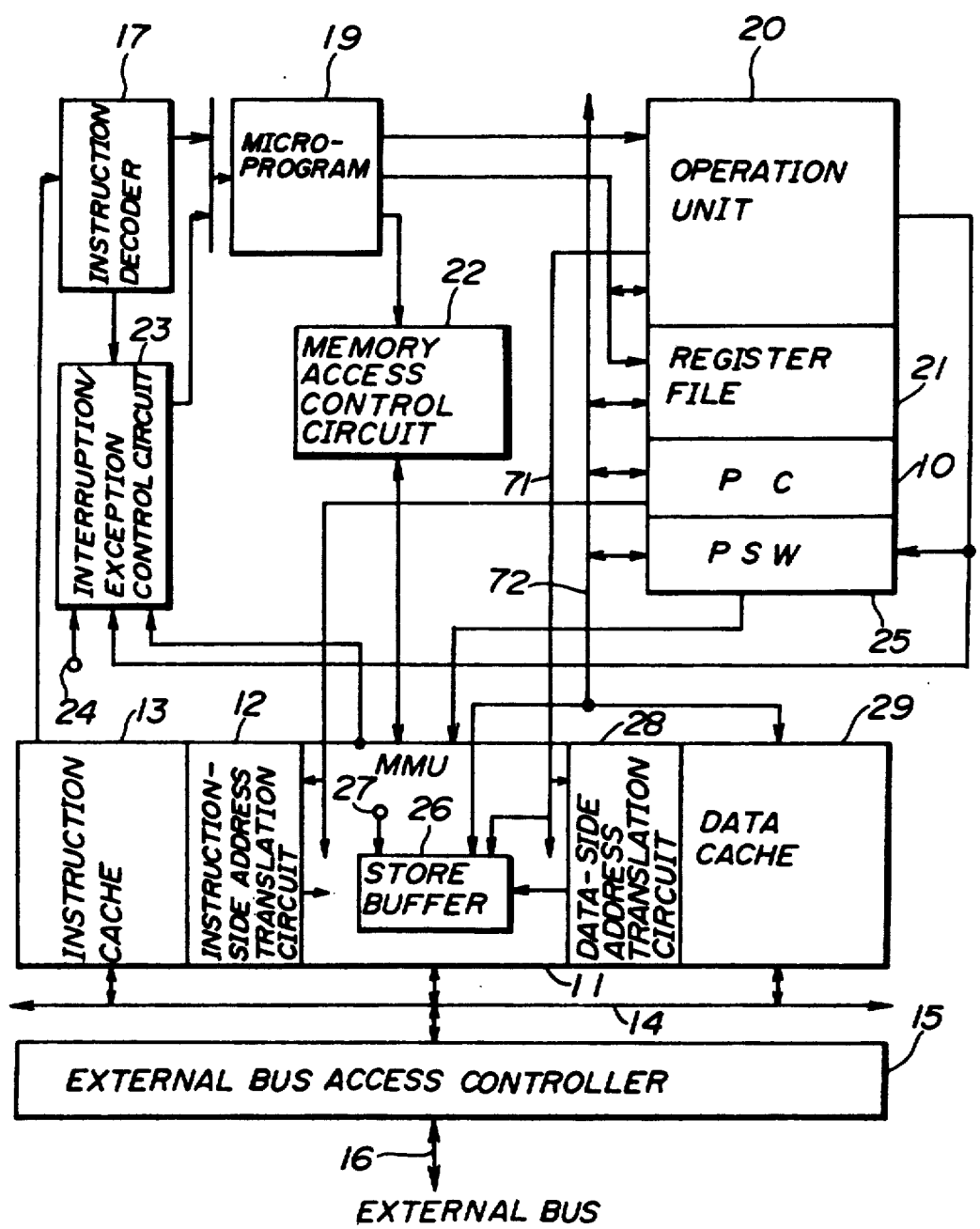
FIG. 2 is a block diagram illustrating a detailed configuration of the microprocessor according to the preferred embodiment of the present invention shown in FIG. 1.

FIG. 2 illustrates a detailed configuration of the microprocessor 100 shown in FIG. 1. The CPU 110 shown in FIG. 1 includes an instruction decoder 17, a microprogram 19, an operation unit 20, a memory access control circuit 22 and an interruption/exception control circuit 23. The cache memory 120 shown in FIG. 1 corresponds to the combination of an instruction cache 13 and a data cache 29. The store buffer 130 shown in FIG. 1 corresponds to a register 26. The register 140 shown in FIG. 1 corresponds to a PSW register 25.

A program counter (PC) 10 has a counter which stores an address of a program being executed. The program counter 10 has an instruction prefetch counter separately from the above-mentioned counter. A program address prefetched by the instruction prefetch counter built in the program counter 10 is supplied to a memory management unit (MMU) 11 and an instruction-side address translation circuit 12. The program address prefetched by the instruction prefetch counter is a logical address, which is converted into a physical address through the instruction-side address translation circuit 12. When the instruction cache 13 does not have an instruction associated with the physical address derived from the instruction-side address translation circuit 12, the memory management unit 11 accesses the external memory 200 (FIG. 1) through an internal bus 14, an external bus access controller 15 and the external bus 16. The associated instruction read out from the instruction cache 13 is input to the instruction decoder 17, which decodes the received instruction and generates a corresponding micro-address.

The microprogram 19 receives a micro-address from the instruction decoder 17 and controls the operation of the operation unit 20 and a register file 21 on the basis of the received micro-address. The microprogram 19 has a micro-processing routine to be activated when executing an exception process. The micro-processing routine controls a saving process for transferring the internal status of the microprocessor to the external memory 200 when executing an exception process and a readout process for reading out a specific program status word and a specific program counter value from the external memory 200. The memory access control circuit 22 controls an access request, the direction and size of the access requested. The micro-processing routine associated with the exception process is designated by the micro-address supplied from the interruption/exception control circuit 23. The interruption/exception control circuit 23 is supplied with an external interruption request through a terminal 24, an exception processing request from the instruction decoder 17 to be generated when an unspecified instruction is detected, an exception processing request from the memory management unit 11, such as an address translation exception request or a bus access exception request, and an exception processing request from the operation unit 20, such as a zero-divide exception request. Then the interruption/exception control circuit 23 makes a decision on priority between the exception processing requests, and generates a micro-address relating to a selected one of the exception processing requests.

Figure 3:
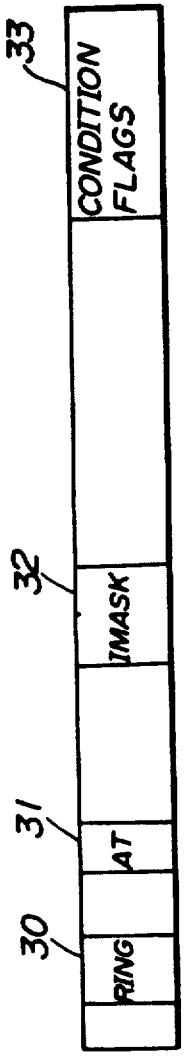
FIG. 3 is a diagram illustrating a program status word.

The PSW register 25 relates to a program which is being executed, and has a format shown in FIG. 3. The PSW register 25 has ring information (RING) 30, an address translation control mode (AT) 31, an interruption mask (IMASK) 32, and condition flags (CONDITION FLAGS) 33. The ring information 30 defines a ring level of the program being executed by which the right to access the external memory 200 is controlled. The ring information is supplied to the memory management unit 11. The address translation control mode 31 indicates whether or not the address translation from a logical address to a corresponding physical address should be executed. The interruption mask 32 indicates an interruption allowance level. The condition flags 33 are generated from the result of operation by the operation unit 20.

The store buffer 26 built in the memory management unit 11 is supplied with access information from the memory access control circuit 22 and the PSW register 25 through a terminal 27. The store buffer 26 is connected to the operation unit 20 through an operand address bus 71, and is connected to the operation unit 20, the register file 21, the program counter 10, the PSW register 25 and the data cache 29 through a data bus 72.

Figure 4:
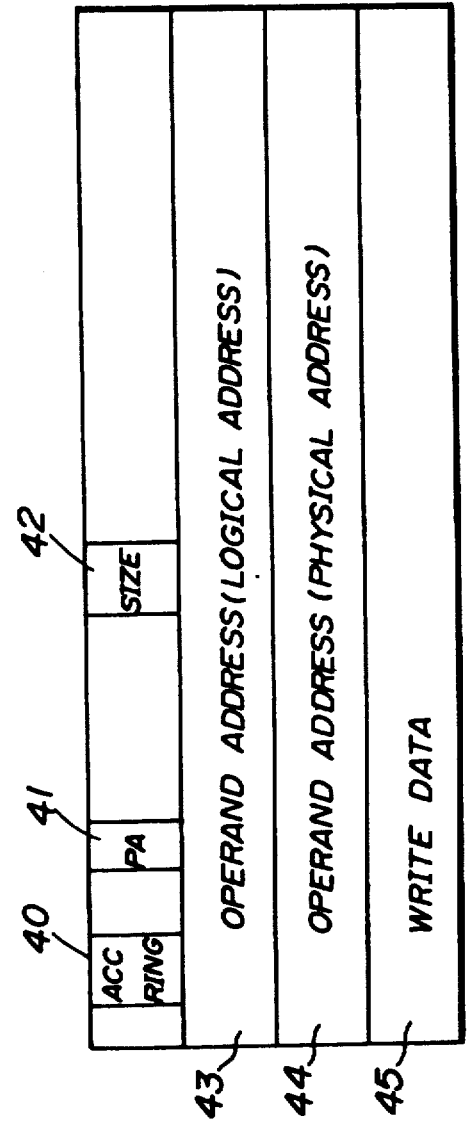
FIG. 4 is a diagram illustrating the contents of each word stored in a store buffer shown in FIG. 2.

Each word having a multi-word structure stored in the store buffer 26 has a format shown in FIG. 4. Each word includes ring information (ACCRING) 40, a physical address code (PA) 41, a read/write code (RW) indicating the direction in which data is written or read out, an operand size 42, operand addresses 43 and 44, and write data 45. The ring information 40 relates to ring information at the time of accessing. The physical address code 41 indicates that there is no need for executing the address translation. The read/write code (RW) indicates the direction of data read/write. The operand address 43 is a logical address, and the operand address 44 is a physical address.

Figure 5:
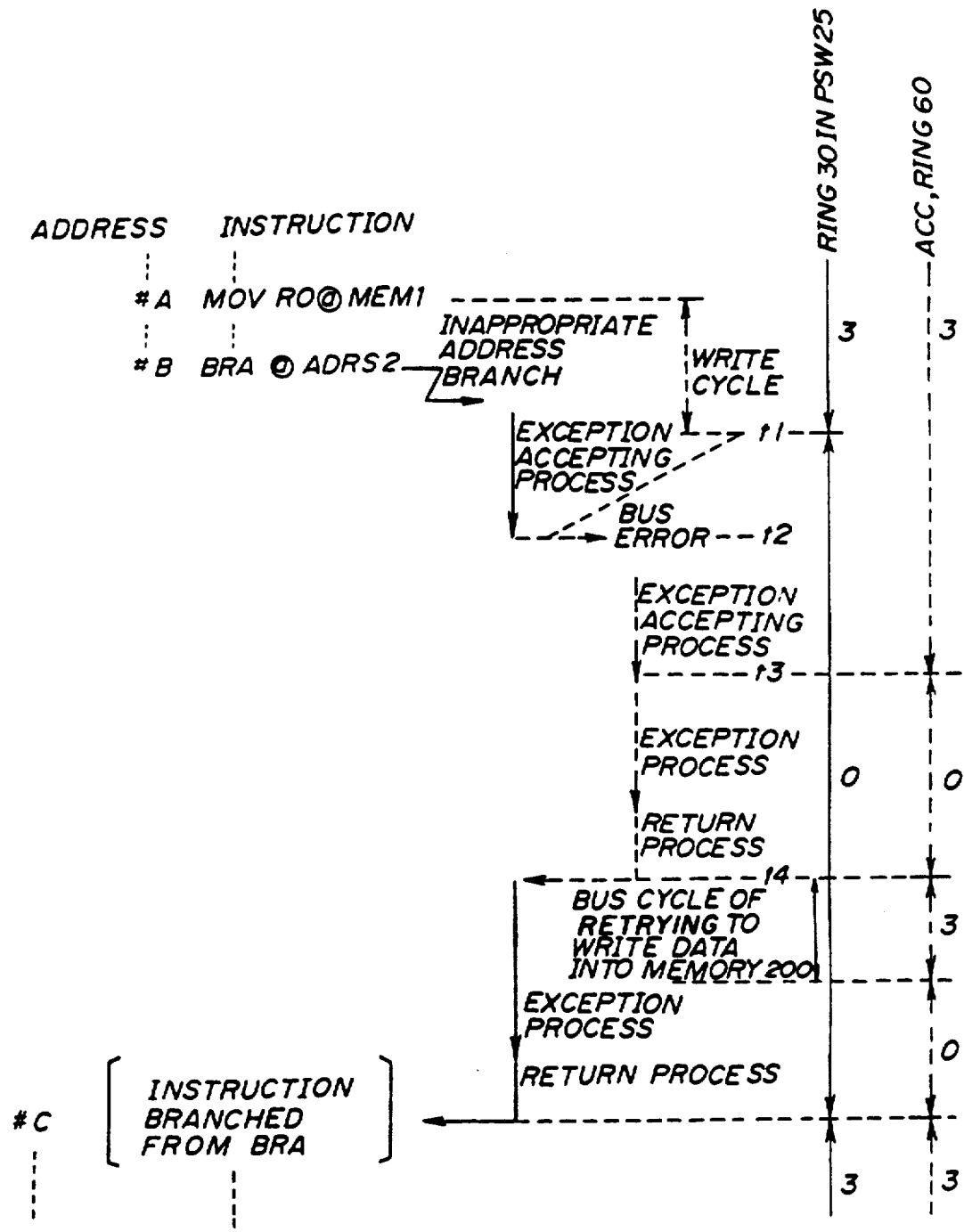
FIG. 5 is a diagram illustrating an operation sequence of the microprocessor shown in FIG. 2.

Referring to FIG. 5, there is shown a move instruction (MOV) having address #A to move data in a register R0 (not shown) in the register file 21 to the external memory 200. The data in the register R0 is subjected to a data check procedure executed by the operation unit 20, which generates condition flags. Then the data in the register R0 is stored in the write data area 45 of the store buffer 26 (FIG. 4). At this time, the current ring information in the PSW register 25 is written into the ring information area 40, and the physical address code (PA) 41, the code indicating the direction of read/write (RW) 42 and the operand size 42 are written into the corresponding areas in the store buffer 26. The move instruction (MOV) is a non-privileged instruction, which has a ring level of '3' when four different ring levels '0', '1', '2' and '3' are provided.

When the aforementioned information is written into the store buffer 26, the memory management unit 11 activates a write processing sequence. When the address translation is requested, a physical address corresponding to logical address @MEM1 of the move instruction is calculated by the data-side address translation circuit 28. Then the obtained physical address makes a write bus cycle active. The program counter 10 determines that the execution of the move instruction is completed when the aforementioned information is written into the store buffer 26. Then the program counter 10 designates the address of a next instruction so that a microprogram of the next instruction is executed.

As shown in FIG. 5, a branch instruction (BRA) having address #B is executed and a branch address @ADRS2 is calculated by the operation unit 20. It is assumed that the branch address @ADRS2 must be an even address, nevertheless it is an odd address. In this case, the operation unit 20 generates an exception processing request associated with the occurrence of an inappropriate address branch, and supplies the same to the interruption/exception control circuit 23. When the exception processing request from the operation unit 20 is accepted by the interruption/exception control circuit 23 and then transferred to the microprogram 19, the microprogram 19 executes an exception accepting process by which the program status word (PSW) obtained immediately after the branch instruction BRA is executed as well as the address of the instruction (#B in the illustrated case) from which the exception processing request results are saved in a saving area in the external memory 200. Thereafter, the specific program status word (PSW) and the specific program counter value PC provided for the exception processing program (micro-processing routine) are read out from a predetermined area of the external memory 200 and then written into the PSW register 25 and the program counter 10, respectively. During this operation, the ring information in the PSW register 25 is changed from a ring level of '3' for normal processing to a ring level of '0' which is a privileged (highest) ring level.

Figure 6:
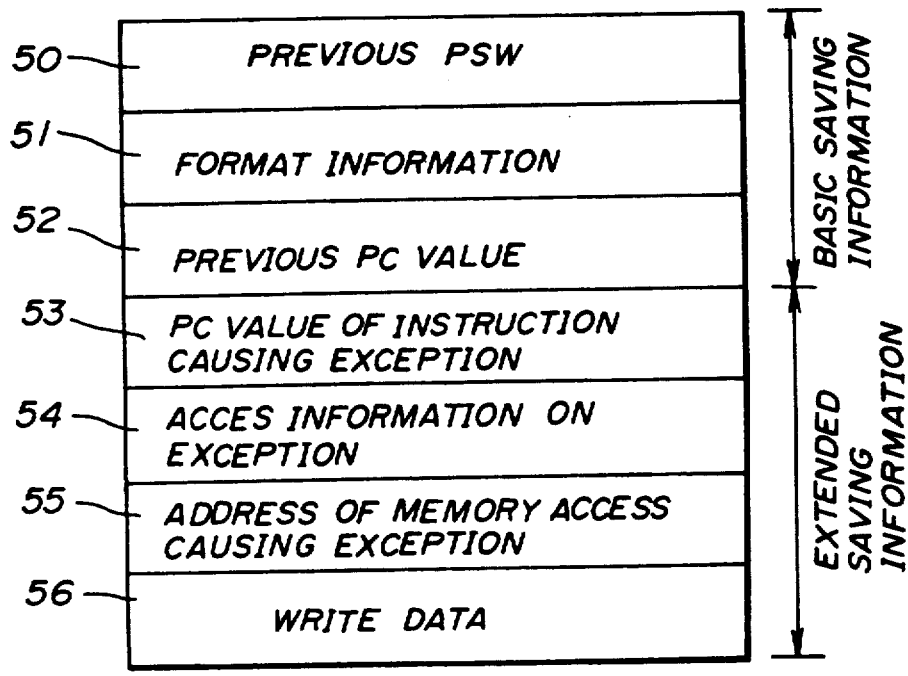
FIG. 6 is a diagram illustrating a format of information to be saved in an external memory shown in FIG. 1 when an exception occurs during a time when the memory is accessed.

Information to be saved in the saving area of the external memory 200 has a structure shown in FIG. 6. The format includes a previous program status word 50 which is the saved program status word, format information 51 indicating a format depending on the type of interruption/exception, and a previous program counter value 52 which is the saved program counter value. The information blocks 50, 51 and 52 form basic saving information. The structure shown in FIG. 6 has extended saving information, which includes the program counter value 53 indicating the instruction which causes an exception, access information 54 on the exception about memory access, an address 55 which is a logical address causing the exception, and corresponding write data 56.

Figure 7:
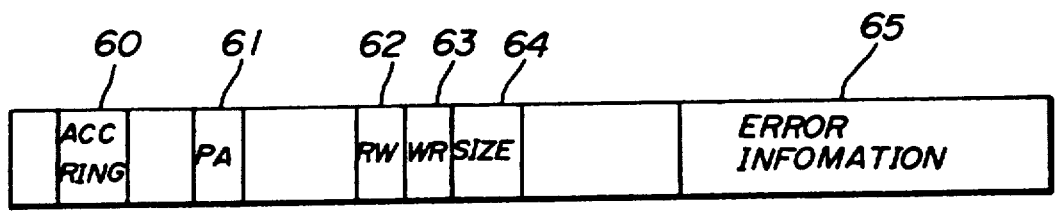
FIG. 7 is a diagram illustrating access information on an exception process which is requested when an error occurs while writing data from the store buffer into the external memory.

The memory access information 54 has a structure shown in FIG. 7. As is shown, the memory access information 54 includes ring information (ACCRING) 60 obtained when accessing the external memory 200, a code (PA) 61 indicating that the address translation procedure is not needed, a code (RW) 62 indicating the direction of read/write, a code (WR) 63 instructing a retry to write data in the store buffer 26 into the external memory 200, an operand size (SIZE) 64 and error information (ERROR INFORMATION) 65 on a cause code indicative of the details of the error.

As shown in FIG. 5, an exception arising from a bus error (write error) occurring during data writing is detected at time $t_1$ while the exception accepting process of accepting the exception processing request associated with the inappropriate address branch is being executed. At this time, an exception accepting process of handling an error occurring when data from the stored buffer 26 is being written into the external memory 200 is started from $t_2$ immediately after the exception accepting process associated with the inappropriate address branch is completed. In the exception accepting process associated with the write error, the following information is written into the predetermined saving areas formed in the external memory 200:

1) A program status word (PSW) obtained at time $t_2$ when the exception processing request arising from the write error is generated;

2) A program counter value PC obtained at time $t_2$, that is, an address to which the control returns after the write error exception process is completed, or in other word, an address of an instruction at the beginning of the program of the inappropriate address branch exception process;

3) Address #A of the instruction which causes the exception due to the write error; and 4) The ring information 40, code 41, operand size 42, operand address 43 and write data obtained when the data writing procedure for writing data from the store buffer 26 into the external memory 200 is activated.

After that, the specific program status word (PSW) and the specific program counter value PC provided for the write error exception process are read out from the predetermined area of the external memory 200 and then written into the PSW register 25 and the program counter 10. It is noted that a privileged ring level of '0' relating to the inappropriate address branch exception accepting process is saved in the previous PSW area 50 (FIG. 6). On the other hand, a ring level of '3' relating to the exception processing request arising from the write error through the store buffer 26 is saved in the ring information area 60 contained in the access information 54.

When the exception accepting process associated with the write error is completed at time $t_3$, the corresponding exception process is started, and a return sequence is activated at time $t_4$ when an instruction to return to the stopped process is executed at the end of the exception process. In the return sequence, the previous program status word (PSW) and the previous program counter value PC are read out from the areas 50 and 52, and then returned to the PSW register 25 and the program counter 10, respectively. Further, the extended saving information shown in FIG. 6 is returned to the store buffer 26.

Thereby, the exception process of handling the inappropriate address branch indicated by the program counter 10 is executed from time $t_4$, and simultaneously the memory management unit 11 retries to read out data from the store buffer 26 and write the same into the external memory 200. It is noted that the ring information used for retrying to write the data into the external memory 200 indicates a ring level of '3' indicated by the ring information 40 which is returned to the store buffer 26 from the predetermined saving area in the external memory 200 independently of a ring level of '0' relating to the exception process of the inappropriate address branch. Thus, when the cause of error is completely eliminated by the exception process executed between $t_3$ and $t_4$, it is possible to correctly write data from the store buffer 2 into the external memory 200. Thus, there is no possibility that the contents of the external memory 200 are damaged. Even when the exception process is requested, ring information is available which is obtained when data is first written into the external memory 200 and which is saved in the ring information area 40 of the store buffer 26. Thus, it is possible to retry to write data into the external memory 200 many times.

After the exception process relating to the inappropriate address branch is completed, an instruction having address #C which is branched from the instruction BRA is executed. In a certain case, the instruction branched from the instruction BRA may be aborted.

The present invention is not limited to the aforementioned embodiment, and variations and modifications may be made without departing from the scope of the present invention.

What is claimed is:

1. A microprocessor capable of connection to an external memory, the external memory accessed by an external bus and including a first predetermined area and a second predetermined area, the first predetermined area and the second predetermined area being separate from each other, the first predetermined area and the second predetermined area of the external memory being assigned corresponding first and second ring information for respectively controlling access to the first and second predetermined areas of the external memory, said microprocessor comprising:

executing means for executing a program having a write instruction;

a register, operatively coupled to said executing means, holding a program status word including the first ring information, the program status word being indicative of a status of the program executed by said executing means;

a store buffer, operatively coupled to said executing means, holding write data and a write address of the external memory associated with the write instruction of the program being executed by said executing means, and holding, in a predetermined area of said store buffer, second ring information indicative of a status of the write instruction of the program being executed by said executing means;

first control means, operatively coupled to said store buffer and to the external memory, for transferring the write data and the write address from said store buffer to the external memory, the transferring being independent of and without control by the executing by said executing means of the program, wherein the write data and the write address are held in said store buffer until the external bus becomes available and are written into said external memory after the external bus becomes available, thereby said executing means is capable of executing a subsequent instruction to the write instruction when the external bus is unavailable;

second control means, operatively coupled to said register and to the external memory, for transferring the first ring information in the program status word from said register to the first predetermined area of the external memory when an exception concerning access to the external memory occurs; and third control means, operatively coupled to said store buffer and to the external memory, for transferring the second ring information from said store buffer to the second predetermined area of the external memory when the exception concerning access to the external memory occurs.

2. A microprocessor as claimed in claim 1,
  wherein said executing means comprises means for executing an exception process program to eliminate a cause of the exception; and
  wherein said second control means, operatively coupled to said register and to the external memory, comprises means for transferring the program status word form the first predetermined area of the external memory to said register when the cause of the exception is eliminated.

3. A microprocessor as claimed in claim 2, wherein the external memory contains the exception process program having a specific program status word including specific ring information, and wherein said microprocessor further comprises
  means, operatively coupled to said register and to the external memory, for transferring the exception process program from the external memory to said executing means and for transferring the specific program status word including specific ring information of the exception process program to said register.

4. A microprocessor as claimed in claim 1,
  wherein said executing means comprises means for executing an exception process program to eliminate a cause of the exception; and
  wherein said third control means comprises
    means, operatively coupled to said register and the external memory, for transferring the ring information, an associated address and data from the second predetermined area of the external memory to the predetermined area of said store buffer when the cause of the exception is eliminated, and
    retrying means for retrying to transfer the ring instruction from said store buffer to the second predetermined area of the external memory.

5. A microprocessor as claimed in claim 4, wherein the external memory contains the exception process program having a specific program status word including specific ring information, and wherein said microprocessor further comprises
  means, operatively coupled to said register and to the external memory, for transferring the exception process program from the external memory to said executing means and for transferring the specific program status word including specific ring information of the exception process program to said register.

6. A microprocessor as claimed in claim 1,
  wherein said executing means comprises means for executing an exception process program to eliminate a cause of the exception;
  wherein said second control means comprises means, operatively coupled to said register and to the external memory, for transferring the program status word from the first predetermined area of the external memory to said register when the cause of the exception is eliminated; and
  wherein said third control means comprises
    transfer means, operatively coupled to said register and to the external memory, for transferring ring information from the second predetermined area of the external memory to the specific area of said store buffer when the cause of the exception is eliminated, and
    retrying means, operatively coupled to said register and to the external memory, for retrying to transfer the ring information from said store buffer to the second predetermined area of the external memory.

7. A microprocessor as claimed in claim 6, wherein the exception process program has a plurality of different exception processes in a sequence of priority, and wherein said executing means further comprises means for executing one of the exception processes based on the sequence of priority.

8. A microprocessor as claimed in claim 1, wherein said third control means comprises means, operatively coupled to said register and to the external memory, for transferring the write data and the write address stored in said store buffer to the second predetermined area of the external memory when the exception concerning access to the external memory occurs.

9. A microprocessor as claimed in claim 1, further comprising means, operatively coupled to said executing means, for stopping said executing means from executing the program until a cause of an exception concerning access to the external memory is eliminated.

10. A microprocessor as claimed in claim 1, further comprising means, operatively coupled to said first control means and to the external memory, for stopping said first control means for transferring the write data to the external memory until a cause of an exception concerning access to the external memory is eliminated.

11. A microprocessor as claimed in claim 1, further comprising a cache memory provided between said executing means and the external memory.

12. A microprocessor as claimed in claim 1, wherein said executing means comprises an operation unit controlled by a microprogram.

13. A microprocessor as claimed in claim 1, wherein the address includes a logical address, and wherein said microprocessor further comprises:
   address translation means, operatively coupled to said store buffer, for translating the logical address into a physical address, which is supplied to the external memory.

14. A microprocessor as claimed in claim 1, wherein the ring information includes a plurality of different ring levels, and wherein each of the first and second predetermined areas of the external memory correspond to one of the different ring levels.

15. A microprocessor connectable to an external memory via an external bus, said microprocessor comprising:
   executing means for executing a program;
   register means, operatively connected to said executing means, for storing a program status word including ring information indicating a level of a memory access right of the program executed by the executing means;
   store buffer means, operatively connected to said executing means and to said register means, for storing write data to be written into said external memory and a write address associated with the write data in accordance with an execution of a write instruction by said executing means, wherein the write data and the write address are held until the external bus becomes available and are written into said external memory after the external bus becomes available, thereby said executing means is capable to execute a subsequent instruction to the write instruction when the external bus is unavailable, and said store buffer means stores the ring information stored in said register means when the write instruction is executed by said executing means;
   save means, connected to said store buffer means and to said register, for saving the write data, the write address, and the ring information stored in said store buffer means and the program status word stored in said register means to said external memory when an exception concerning an access to said external memory occurs before a write operation from said store buffer means to said external memory is executed; and
   restore means, connected to said store buffer means and to said register means, for restoring the saved write data, the write address, and the ring information, for saving the write data, the write address, and the ring information, for saving the write data from said external memory to said store buffer means when the exception is eliminated, wherein said store buffer means writes the write data into said external memory without reexecuting said write instruction in reference to the write address and the ring information stored therein after a restore operation by said restore means.

16. A microprocessor according to claim 15, wherein said executing means changes the ring information even through a write operation from said store buffer means to said external memory is not executed, and said store buffer means writes the write data into said external memory in reference to the write address and the ring information stored therein.

* * * * *

UNITED STATES PATENT AND TRADEMARK OFFICE
CERTIFICATE OF CORRECTION

PATENT NO. : 5,201,052

DATED : 4/6/93

INVENTOR(S) : Ohshima

It is certified that error appears in the above-identified patent and that said Letters Patent is hereby corrected as shown below:

Col. 1, line 38, "2" should be --0--;

Col. 6, line 36, delete "42" (first occurrence);

Col. 11, line 2, (claim 10) "for" should be --from--.

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,201,052
DATED : April 6, 1993
INVENTOR(S) : Ohshima

It is certified that error appears in the above-identified patent and that said Letters Patent is hereby corrected as shown below:

Title page, item (54), after "BUFFER" insert --RESPECTIVELY TO EXTERNAL MEMORY--.

Col. 1, line 5, after "BUFFER" insert --RESPECTIVELY TO EXTERNAL MEMORY--.

Signed and Sealed this

Eleventh Day of January, 1994

Attest:

BRUCE LEHMAN

*Attesting Officer*     *Commissioner of Patents and Trademarks*